US005703797A

United States Patent [19]

Russell

[11] Patent Number: 5,703,797

[45] Date of Patent: Dec. 30, 1997

[54] METHOD AND APPARATUS FOR TESTING ACOUSTICAL DEVICES, INCLUDING HEARING AIDS AND THE LIKE

[75] Inventor: Timothy M. Russell, Tigard, Oreg.

[73] Assignee: Frye Electronics, Inc., Tigard, Oreg.

[21] Appl. No.: 411,305

[22] Filed: Oct. 13, 1994

[51] Int. Cl.[6] .......... G06F 17/00

[52] U.S. Cl. .......... 364/576

[58] Field of Search .......... 364/553, 726, 364/576, 574; 381/68.4, 68.2, 68, 60

[56] References Cited

U.S. PATENT DOCUMENTS 4,885,708 12/1989 Yamaguchi et al. .......... 364/553

*Primary Examiner*—Ellis B. Ramirez

*Attorney, Agent, or Firm*—Jack E. Day

[57] ABSTRACT

A method and apparatus for testing hearing aids under condition of actual use where a microprocessor is programmed to generate a warbled pure tone and analyses of the signal as processed by the device. The generated signal and a amplified signal by the hearing aid are analyzed by use of a digital Fourier transform (DFT) to arrive at the transfer function of the device in an setting approximating the environment of use and independent of extrinsic noise.

10 Claims, 1 Drawing Sheet

METHOD AND APPARATUS FOR TESTING ACOUSTICAL DEVICES, INCLUDING HEARING AIDS AND THE LIKE

The present invention relates to test methods and apparatus for acoustical devices in general and, in particular, to an improved method and apparatus for testing hearing aids and the like devices, and obtaining a transform function therefrom, under conditions of actual use.

BACKGROUND OF THE PRESENT INVENTION

Determining the acoustic gain or transfer function of hearing aids and other acoustical devices is of great concern to those who design, manufacture, and adjust them. It is desirable that the hearing aid produce amplification that is suitable for the individual hearing loss being treated.

Usually, hearing aids and other devices are tested by exposing them to standard sound fields, that is, pure tones of standard frequencies and energies, within sound-treated enclosures. However, among the problems encountered when testing acoustical devices using a pure-tone sound field under conditions of actual use are:

ambient or extrinsic noise due to the presence of persons and equipment in the immediate area; and resonances and standing waves at certain frequencies due to reflections from walls and objects in the area. (see footnote)

Although resonances and standing waves are technically different, they will be used interchangeably herein, except where to do so would cause confusion. According to WEBSTER'S NINTH NEW COLLEGIATE DICTIONARY Miriam-Webster, Inc., Springfield, Mass. (1987):

resonance: "a vibration of large amplitude in a mechanical . . . system caused by a relatively small periodic stimulus of the same or nearly the same period as the natural vibration period of the system";

standing wave: "a single-frequency mode of vibration of an object or physical system in which the amplitude varies from place to place, is constantly zero at fixed points, and has maxima at other points."

A current solution to measuring the acoustic or transfer function in the presence of extrinsic noise is to use an analog tracking bandpass filter, such as is employed in the RM 500 Hearing Aid Analyzer manufactured by "audio-scan" Division of Etymonic Design Incorporated, of Dorchester, Ontario, Canada.

Another solution to the extrinsic noise problem is to use a software filter algorithm such as the Discrete Fourier Transform (DFT) to extract only the desired puretone signal from the noise, as embodied in the Model FP 30 Hearing Aid Analyzer, manufactured by Frye Electronics, Inc., of Tigard, Oreg. (Assignee of the present invention). If noise is the only problem to be compensated for, then the conventional software DFT filter can be used to save the cost of implementing the analog filter.

However, filtering by itself does not deal adequately with resonances and standing waves initiated by the test signal and its amplified version, since the filter perceives these as a part of the test signal. A current solution to this problem is to use a "warbled" pure-tone test signal, i.e., one in which the frequency of the test signal is varied in a known way about a center frequency $f_c$, e.g., from $-5\%$ $f_c$ to $+5\%$ $f_c$. This type of signal reduces the intensity of standing waves, since a single pure-tone signal is not being generated, and resonances do not have time to fully develop. The intensity of those resonances and standing waves which do develop are further reduced by the smoothing effect caused by averaging-in the responses at frequencies near those frequencies which cause standing waves. A suitable analog tracking-bandpass filter will again be useful in this situation to extract the energy of the warbled tone from the ambient noise.

Extracting an approximation of the warbled tone energy from the ambient noise, including standing waves and resonances, by using a DFT would require performing several DFTs, one at center frequency $f_c$, and at least one each at a frequency on either side thereof, typically, plus or minus 5% deviation. Unfortunately, the time required to perform these computations might easily be so great that the software filter would no longer be an acceptable solution.

BRIEF DESCRIPTION OF THE PRESENT INVENTION

The present invention is a method and apparatus using a "warbled" Discrete Fourier Transform that is tailored to a warbled test tone. The benefit to be obtained from the use of this algorithm is that only one operation on the amplified sound at each center frequency is required to extract the energy of the warbled tone from the room noise.

A warbled pure-tone is a pure-tone whose center frequency $f_c$ is continuously and smoothly varied between desired positive and negative limits on either side of the center frequency, i.e., $-x\%$ $f_c$ and $+x\%$ $f_c$. The rate at which this complete cycle of frequency variation is completed is the warble rate $f_w$. The manner in which the warble changes is called its "shape", $w_s$. One typical warble shape is a sine function; another is a triangular function, in which the frequency variation is linear over time between the positive and negative frequency limits.

The Warble Discrete Fourier Transform substitutes computed cosine and sine waves that are warbled in precisely the same manner as the warbled test signal, i.e., the same center frequency $f_c$, the same percentage of frequency variation plus or minus $x\%$ $f_c$, the same warble rate $f_w$, and the same warble shape $w_s$.

As with the DFT, the phase of the input signal $f_c$ does not need to be known. However, the phase within the warble cycle needs to be known in order to approximately line up the sample array and the computed warbled cosine and sine waves. This is necessary in order for the frequencies of the sample and computed waves to track each other as the warbled DFT is computed. This means that the time delay $t_d$, as the signal passes through the air and the test device, must be known. It also means that reflected warbled signals arriving at a different time than that from the direct path will be attenuated to some degree.

The number of samples taken must be large enough to encompass substantially all of one warble period, instead of just one pure-tone cycle period when using a standard DFT. The number of samples processed can be one-half of those in a warble period since a complete sweep of the desired frequency range takes place during a transition from one frequency extreme to the other.

DETAILED DESCRIPTION OF THE PRESENT INVENTION

Figure 1:
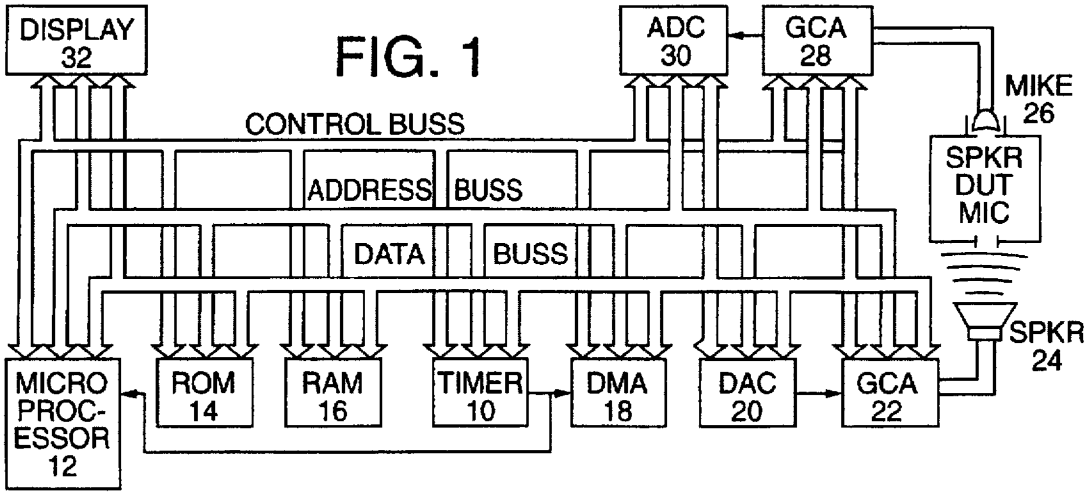
FIG. 1 discloses a preferred arrangement of hardware which will give the desired transfer function when controlled by the program listing of the present invention.

A standard DFT extracts the energy at a given frequency by multiplying each point in a sampled data array by the corresponding points in both computed cosine and sine waves. The products of the sampled data and the cosine wave are summed together as the 'REAL' part, and the products of the sampled data and the sine waves are summed as the 'IMAGINARY' part. These two sums are then each divided by the number of samples that were processed, and then combined as the square root of the sum of the squares (RMS).

The phase of the desired pure-tone in the sampled data does not need to be known in order to extract its energy using the DFT.

The number of samples processed must encompass an integral number of cycles of the desired puretone frequency. The number of elements in both the computed cosine and sine waves needed to complete one cycle should be equal to the sample rate divided by the frequency to be extracted.

A "warbled" pure-tone is a pure-tone whose frequency is continuously and smoothly varied from the center frequency $f_c$ to a desired percentage below or above the center frequency (plus or minus x% $f_c$), to the opposite limit, and back to the center frequency. The rate at which this complete cycle of variation is repeated is the warble rate $f_w$. The "way" in which the frequency varies is called its shape. One obvious warble shape would be a sinewave, because of the ease of generation; however, a computation needs to be performed to determine the frequency value for each sample time. For that reason, the preferred embodiment is a triangular warble shape, where the frequency varies uniformly from one limit to the other, and then reverses. The frequency variation, then, from $f_c$ to either limit is directly proportional to the fraction of warble period $t_w$ which has elapsed since the warble cycle began.

Tests have shown that a frequency variation of plus or minus 50% gives no less or more valid results than a variation of plus or minus 5%, which is the preferred embodiment of the warble.. Although it is unknown, at this time, what such a large warble variation might be used for, it is recognized that the utility of the present invention extends at least to the limits of plus or minus 50%.

The Warble Discrete Fourier Transform of the present invention substitutes computed cosine and sine waves that are warbled in precisely the same way as the test signal, i.e., the same center frequency $f_c$, the same frequency variation plus or minus x% $f_c$, the same warble rate $f_w$, and the same warble shape $s_w$.

As with the DFT, the phase of the input signal does not need to be known. However, the position within the warble cycle does need to be known in order that it approximately line up the sample array and the computed warbled cosine and sine waves. This is necessary in order for the frequencies of the sample and computed waves to track each other as the warbled DFT is computed. Because of this factor, reflected warbled signals, arriving at a significantly different time than those on the direct path, will be attenuated to a significant degree.

The time delay, as the signal passes through the air and the test device, must also be known approximately, for accurate transfer function determination. It has been determined that for any given distance between speaker and microphone, a variation of plus or minus 6 inches gives satisfactory results. The preferred embodiment uses 18 inches as an estimated separation between speaker and microphone, with variation of plus or minus 6 inches permitted.

The number of samples taken must be at least sufficient to encompass almost all of one warble period, instead of just one pure-tone cycle period when using a standard DFT. The number of samples processed, however, can be one-half of those in a warble period since a complete sweep of the desired frequency range takes place during one-half the warble period as the frequency passes from −x% to +x% of the center frequency, or vice-versa. The warble rate in the preferred embodiment is 33⅓ herz, and the preferred sample rate is 25.6 kHz, giving 768 samples per warble period, or 384 samples per half-cycle of warble rate.

Turning now to FIG. 1, we see one arrangement of apparatus for making use of the algorithm of the present invention for measuring the transfer function of a Device Under Test (DUT), in an environment which duplicates, as closely as possible, a typical environment of use:

1. timer 10 is programmed to generate a square-wave at the desired sample rate, and acts as the timer for the system;
2. microprocessor 12 is the control element of the entire system, as instructed by the control program of Read-Only-Memory (ROM) 14;
3. ROM 14 contains control programs which guide, among other functions, the microprocessor to generate the warbled pure-tone which is used to test DUT. The warbled pure-tone is computed one sample at a time, according to the program, and the digital representation thereof is stored in Random Access Memory (RAM) 16;
4. RAM 16 stores digital representations of both the warbled test waveform and the amplified version thereof which has passed through DUT;
5. Direct Memory Access (DMA) 18 calls upon RAM 16 to deliver one sample of the warbled test waveform to Digital-to-Analog Converter (DAC) 20;
6. first Gain Controlled Amplifier (GCA) 22 adjusts the warbled test tone to the proper energy level for driving speaker 24 to develop a sound field of a level adequate to test DUT;
7. a microphone, or input port, of DUT responds to the sound field, as well as to extrinsic noise, and any external resonances and reflections of the sound field, all of which are amplified and further distorted by any internal reflections, resonances and feedback within DUT, and produces an amplified sound at its output transducer, or port, which is representative of its own response as well as the extrinsic noise;
8. the amplified acoustic energy of DUT is coupled to Test Microphone 26, which passes it on to second Gain Controlled Amplifier (GCA) 28;
9. second GCA 28 adjusts the acoustic energy to an appropriate level for driving Analog-to-Digital Converter (ADC) 30 near its maximum input level without distortion, minimizing quantitization error on the one hand, and avoiding the introduction of distortion by overdriving second GCA 28;
10. ADC 30 converts the amplified and modified test signal to digital form for processing with the warbled DFT;
11. Display 32 displays the transform function of DUT in some satisfactory form, so that it can be clearly seen and measured in some meaningful way.

RELATIONSHIP OF TEST SIGNAL, WARBLE, AND WARBLE DFT

Figure 2A:
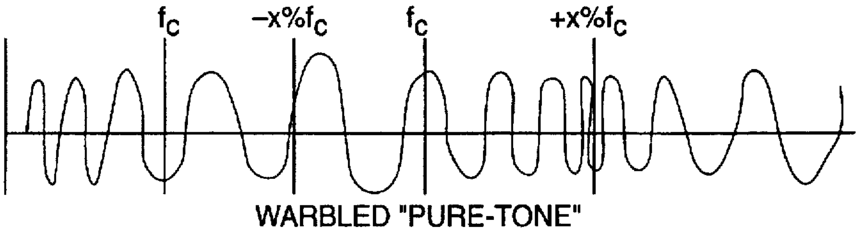
FIGS. 2A–C discloses the relationships between the center frequency $f_c$ of the warbled test signal, the amount of deviation plus or minus $x\%$ $f_c$ of the test signal, and the shape and period of the warble.
Figure 2B:
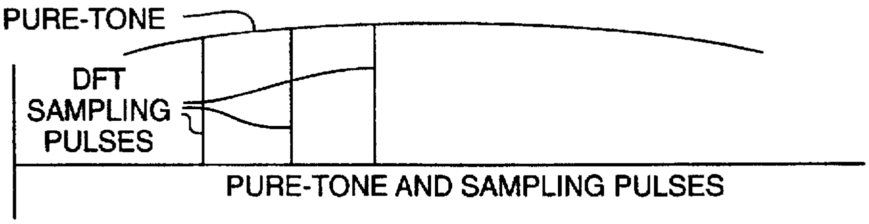
Figure 2C:
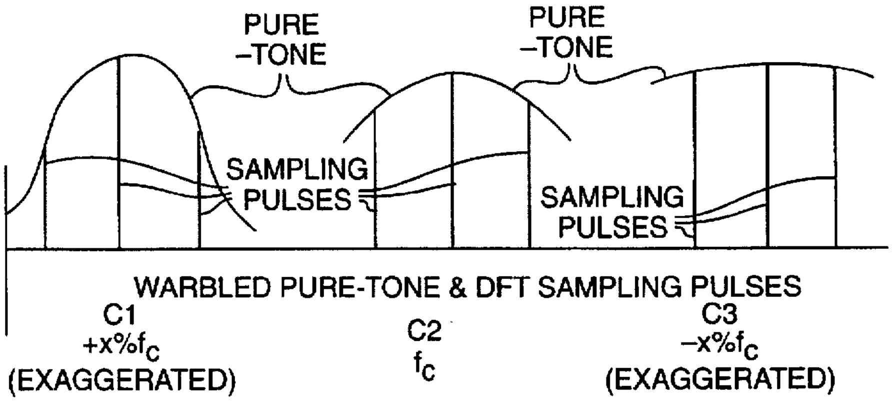

FIGS. 2A–C discloses the relationship between a pure-tone test signal and Discrete Fourier Transform (DFT) sampling pulses, and a warbled "pure-tone" test signal and Warbled Discrete Fourier Transform sampling pulses.

Obviously, a warbled signal cannot, in the strictest sense of the term, be a "pure-tone" signal, which consists of a sinusoidal signal of a single, unvarying frequency. By definition, a "warbled" signal varies to some degree within limits which are above and below a center frequency.

In FIG. 2A, we see a greatly exaggerated warbled signal, with center frequency $f_c$, and limits $-x\%\ f_c$ and $+x\%\ f_c$ indicated therein. Although $f_c$ does vary, the variation is so slight that, for all practical purposes, the circuitry involved treats the signal as a pure tone.

In FIG. 2B we see the expanded outline of an unvarying puretone signal, with several DFT sampling pulses indicated.

In FIGS. 2C(1)–(3), we see the exaggerated expanded outline of warbled "pure-tone" signals, at $-x\%\ f_c$, $+x\%\ f_c$, and $f_c$, with several warbled DFT sampling pulses indicated. Because of the much lower frequency of the pure-tone testing signals, frequency variation appears as a timing variation with respect to a given time. The DFT sampling pulses are not warbled at the same time, so that the time of occurrence of a sampling pulse with respect to the pure-tone is the same as it is with an unvarying pure-tone.

BRIEF DESCRIPTION OF THE WARBLE ROUTINE

This description describes the novel warble routine claimed in this application, as applied to an arrangement of test apparatus hereinbefore described, which is embodied in a novel hearing aid analyzer. The routine is based on a Z80 code listing prepared for operating said hearing aid analyzer.

Actual routine names, storage location names, and line numbers, as disclosed INFRA, are referred to.

The novel "warble" DFT routine that is called from outside this file is named "WRBDFT" and starts on line 61, as disclosed INFRA.

Each line of this routine will now be explained.

The sine and cosine lookup table pointer "STEPCON" is initialized in lines 63,64.

The routine, which determines how much "STEPCON" needs to be advanced between each sample to be processed to obtain the center frequency $f_c$, is called "WADVNM" and is called up on line 65.

The routine which determines how much to change the frequency to obtain the warbled DFT (which in this embodiment is plus or minus 5% of $f_c$), is named "CWADNM" and is called for on line 66.

The routine which takes account of the fact that only one-half of the warble cycle needs to be processed to obtain the needed values, is named "SF5PER" and is called up on line 67.

The sample element counter is initialized in lines 68,69.

The real and imaginary component sums are cleared in lines 70–72.

The sample pointer array is initialized in line 73. The first sample pointed to is taken when the frequency was +5% above $f_c$. The delay time to account for the space between test speaker and the microphone of the hearing aid, and between the hearing aid speaker and test microphone is taken into account here.

The sample loop begins on line 74.

The cosine value for the current "STEPCON" value is loaded into a register by calling the routine named "LODCOS" on line 74, then is multiplied by the current sample in lines 75,76. This product is then added to the real sum in lines 77–85.

The sine values for the current "STEPCON" value are loaded into a register by calling the routine named "LODSIN" in line 86, and are then multiplied by the current sample in lines 87,88. The products are then added to the imaginary sum in lines 89–97.

The sample pointer is advanced in line 98.

The advance number is adjusted down by the warble adjust number by calling for routine "WBLADJ" in line 99. It is this action that makes this a "warbled" DFT instead of a standard single frequency DFT. The advance number is used to advance the step counter by calling "ADVPTR" in line 100. The element counter is also decremented and tested to see if all samples have been processed.

The process from lines 74 to 100 is repeated until all samples have been processed.

The 24 bit real process sum is returned in the D and IX registers, and the imaginary sum is returned in the E and IY registers.

Following the routine of the present invention, the real and imaginary sums each need to be divided by the number of samples processed, squared and added together, and then the square root taken to obtain the actual magnitude sought. This is performed in the standard DFT program of which this is a part.

OUTLINE OF THE WARBLE
DISCRETE FOURIER TRANSFORM ROUTINE

START:

1. Do initialization:
   a. initialize sine and cosine lookup table pointer;
   b. compute center frequency advance number;
   c. compute Warble advance number;
   d. increase initial advance number 5%;
   e. initialize the element counter;
   f. clear the real and imaginary component sums;
   g. initialize the sample array pointer;
2. Begin Loop process:
   a. load current cosine value;
   b. multiply cosine by current sample value;
   c. add product to real sum;
   d. load current sine value;
   e. multiply sine by current sample value;
   f. add product to imaginary sum;
   g. advance the sample pointer;
   h. subtract warble adjust number from advance number;
   j. add advance number to sine and cosine table pointer;
   k. decrease element counter;
3. Repeat loop until all samples are processed, and then return to regular DFT program.

INDEX OF PROGRAM SYMBOLS OF THE WARBLED DFT ROUTINE

The following is a list of program symbols used in the Warbled DFT routine, the lines where they are defined, their values, and the line references where they appear.

| DEFINITION | SYMBOL NAME | VALUE | LINE REFERENCES | | | | |
|---|---|---|---|---|---|---|---|
| 6 | ADEHME | External | 158 | 211 | | | |
| 7 | ADVANC | External | 124 | 137 | 154 | 210 | 225 |
| 222 | ADVPTR | 00FB | 100 | | | | |
| Pre | CODE | 0000 | | | | | |
| 134 | CWADNM | 007D | 66 | | | | |
| 251 | D24161 | 0122 | 244 | | | | |
| 242 | D2416V | 0111 | 120 | 250 | | | |
| Pre | DATA | 0000 | | | | | |

-continued

| DEFI-NITION | SYMBOL NAME | VALUE | LINE REFERENCES | | | |
|---|---|---|---|---|---|---|
| 7 | DATARR | External | 73 | | | |
| 6 | DIV24 | External | 140 | 142 | 157 | 252 |
| 7 | ELECNT | External | 69 | 228 | 230 | |
| 5 | LDAHL | External | 179 | | | |
| 5 | LDEHL | External | 138 | 155 | | |
| 5 | LDSNVL | External | 195 | | | |
| 178 | LODCO1 | 00BE | 174 | | | |
| 188 | LODCO2 | 00D3 | 184 | 186 | | |
| 169 | LODCOS | 00AF | 74 | | | |
| 195 | LODSIN | 00D5 | 86 | | | |
| 6 | MUSAHL | External | 76 | 88 | | |
| 7 | PROSIZ | External | 68 | 119 | | |
| 6 | REVSHL | External | 187 | 198 | 209 | |
| 151 | SF5PER | 0097 | 67 | | | |
| 8 | SINTBL | External | 178 | | | |
| 8 | STEPCN | External | 64 | 170 | 224 | 227 |
| 5 | SVEHL | External | 125 | 159 | 212 | |
| 7 | WADNUM | External | 143 | 208 | | |
| 111 | WADVNM | 005B | 65 | | | |
| 204 | WBLADJ | 00E0 | 99 | | | |
| 74 | WRBDF1 | 0025 | 101 | | | |
| 84 | WRBDF2 | 0038 | 82 | | | |
| 96 | WRBDF3 | 004D | 94 | | | |
| 61 | WRBDFT | 0000 | 3 | | | |

The program herein disclosed, both separately and in cooperation and combination with the apparatus which it controls, is not limited to the precise steps enumerated. The novelty lies in the development of a "Warbled" Discrete Fourier Transform (DFT) which is warbled in synchronism with a warbled "puretone" test signal, and is applied to a Device Under Test (DUT) in an acoustic environment approximating the environment of use of the DUT. The Warbled DFT performs the transform operation on said test signal, giving a transfer function for said DUT which is independent of extrinsic noise, or resonances and standing waves which would tend to be developed as a result of the test signal reacting with the acoustic environment of the test. Any method which provides a transfer function of any kind of a DUT by combining a Warbled DFT with a Warbled test signal is intended to be covered by this disclosure, even though the steps of the program routine may not be precisely the same.

Further, the method and functions of the present invention are applicable, not only to the testing of electronic acoustic devices, but even to the testing of a simple piece of tubing, as a mechanical acoustic device. For example, it would be useful in determining the transfer functions of wind instruments, which are essentially pieces of tubing with shaped input and output ports.

Still further, the method and functions of the present invention are applicable to obtaining the transfer functions of devices which are not mechanical at all, but are wholly electronic, depending only upon the fact that they accept an oscillatory input, even electronic, and have an oscillatory output related to the input. A continuous-wave distance measuring radar is an example. It is intended that all adaptations of the basic method and functions described here are covered, within the limits of present-day technology.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

"WARBLE" DISCRETE FOURIER TRANSFORM ROUTINE

SECOND LEVEL ROUTINE

A.D. Z80 Macro Assembler—Version 4.04a
Input Filename: WDFT.SRC
Output Filename: ..\OBJECT\WDFT.obj

```
1 TITLE 'FP40 WARBLE DFT ROUTINE
2
3 PUBLIC WRDFT
4
5 EXTERN LDAHL,LDEHL,SVEHL,LDSNVL
6 EXTERN REVSHL,ADEHME,MUSAHL, DIV24
7 EXTERN PROSIZ,ELECNT,DATARR,WADNUM, ADVANC
8 EXTERN STEPCN, SINTBL
9
10 ;DESCRIPTION OF ROUTINES IN OTHER FILES:
11
12 ;LDAHL—LOAD CONTENTS OF LOCATION IN HL PLUS OFFSET
13 ;IN A TO A. ONLY A AFF.
14
15 ;LDEHL—LOAD EHL FROM MEMORY AT (BC), ONLY A,E,HL AFF
16
17 ;SVEHL—SAVE EHL TO MEMORY AT (BC). NO REGS AFF.
18
19 ;LDSNVL—LOAD THIS POINT IN SINE TABLE TO (H)L.
20 ;H ONLY HAS SINE BIT IN BIT 7. ONLY A,HL AFF.
21
22 ;REVSHL—REVERSE SIGN OF HL. CARRY SET IF BORROW
23 ;FROM BIT 16. ONLY A,HL AFF.
24
25 ;ADEHME—ADD 24 BIT WORD AT (BC) TO EHL. RESULT
26 ;IN EHL. CARRY SET IF OVERFLOW. ONLY A,E,HL AFF.
27
28 ;MUSAHL—8x16 SIGNED MULTIPLY OF A*HL WITH RESULT IN
29 ;AHL. ONLY A,HL AFF.
30
31 ;DIV24—24/8 BIT UNSIGNED DIVIDE WITH 24 BIT RESULT.
32 ;FORMAT IS EHL=EHL/A. ONLY A,DE,HL AFF.
33
34
35 ;DESCRIPTION OF STORAGE LOCATIONS:
36
37 ;PROSIZ—16 BIT WORD INDICATING THE NUMBER OF ELEMENTS
38 ;THAT THE WARBLE DFT NEEDS TO PROCESS.
39
40 ;ELECNT—16 BIT DFT ELEMENT COUNTER.
41
42 ;DATARR—TIME BASED DATA INPUT ARRAY. SINGLE BYTE 8 BIT
43 ;2'S COMPLEMENT FORM.
44
45 ;WADNUM—16 BIT WARBLE ADJUST NUMBER. INTEGER PART IN
46 ;UPPER BYTE AND FRACTIONAL PART IN LOWER BYTE.
```

```
47
48 ;ADVANC—THE 24 BIT STEP ADVANCE NUMBER. INTEGER PART IN
49 ;MOST SIGNIFICANT BYTE & FRACTIONAL PART IN LOWER TWO BYTES.
50
51 ;STEPCN—16 BIT WORD. UPPER BYTE IS POINTER INTO 256
52 ;ELEMENT SINE LOOKUPTABLE. LOWER BYTE IS FRACTIONAL PART.
54 ;SINTBL—64 BYTE ¼ SINEWAVE TABLE, EACH ELEMENT IS THE 1
55 ;BYTE MAGNITUDE FOR THAT POSITION WITHIN THE SINEWAVE.
56
57 ;WRBDFT—DO WARBLED DFT. EXPECTS 2*#CYCLES IN ACC.
58 ;REAL AND IMAG RETURNED IN DIX & EIY.
59 ;ONLY A,DE,IX,IY, AFF.
60
61 WRBDFT: PUSH BC
62 PUSH HL
63 LD HL,0 ;INIT STEPCN
64 LD (STEPCN),HL
65 CALL WABVNM ;COMPUTE ADVANCE #
66 CALL CWADNM ;COMPUTE WARBLE ADJ#
67 CALL SF5PER ;SHIFT INIT FREQ UP 5%
68 LD HL(PROSIZ);LOAD #STEPS TO (ELECNT)
69 LD (ELECNT),HL
70 LD IX,0 ;INIT REAL & IMAG COMPONENTS
71 LD IY,0
72 LD DE,0
73 LD BC,DATARR;POINT TO SAMPLE ARRAY
74 WRBDF1: CALL LODCOS ;LOAD THIS STEP COSINE
75 LD A,(BC), ;LOAD THIS SAMPLE
76 CALL MUSAHL ;MULT SAMPLE BY COSINE
77 EX DE,HL ;ADD TO REAL SUM
78 ADD IX,DE
79 EX DE,HL
80 LD A,0
81 BIT 7,H
82 JR Z,WRBDF2
83 LD A,0FFH
84 WRBDF2: ADC A,D
85 LD D,A
86 CALL LODSIN ;LOAD THIS STEP SINE
87 LD A,(BC) ;LOAD THIS SAMPLE
88 CALL MUSAHL ;MULT SAMPLE BY SINE
89 EX DE,HL ;ADD TO IMAG SUM
90 ADD IY,DE
91 EX DE,HL
92 LD A,0
93 BIT 7,H
94 JR Z,WRBDF3
95 LD A,0FFH
96 WRBDF3: ADC A,E
97 LD E,A
98 INC BC ;POINT TO NEXT STEP
99 CALL WBLADJ ;ADJUST ADVANCE# FOR WARBLE
100 CALL ADVPTR ;ADVANCE THE STEP POINTER
101 JR NZ,WRBDF[b ]1;DO NEXT STEP
102 POP HL
103 POP BC
104 RET
105
106 SUBTITLE 1ST LEVEL SUBROUTINES
107
108 ;WADVNM—COMPUTE WARBLE ADVANCE NUMBER GIVEN 2*#CYCLES
109 ;IN ACC. ONLY A AFF.
110
111 WADVNM PUSH BC
112 PUSH DE
113 PUSH HL
114 LD E,A ;LOAD #CYCLES*65536 TO EHL
115 LD,HL,0
116 SRL E
118 RR H
119 LD BC,(PROSIZ):LOAD #STEPS TO PROCESS
120 CALL D2416V ;(#CYCLES*65536)/#STEPS
121 LD EH ;MULT BY 256
122 LD H,L
123 LD L,0
124 LD BC,ADVANC:SAVE ADVANCE#
125 CALL SVEHL
126 POP HL
127 POP DE
128 POP BC
129 RET
130
131
132 ;CWADNM—COMPUTE 5% WARBLE STEP ADJ#. ONLY A AFF.
133
134 CWADNM: PUSH BC
135 PUSH DE
136 PUSH HL
137 LD BC,ADVANC;LOAD 5% TO EHL
138 CALL LDEHL
139 LD A,20 ;COMPUTE 5% OF ADVANCE#
140 CALL DIV24
141 LD A,384/2 ;COMPUTE SINGLE STEP ADJ#
142 CALL DIV24
143 LD (WADNUM),HL;SAVE WARBLE ADJUST NUMBER
144 POP HL
145 POP DE
146 POP BC
147 RET
148
149 ;SF5PER—SHIFT FREQUENCY UP 5%. ONLY A AFF.
150
151 SF5PER: PUSH BC
152 PUSH DE
153 PUSH HL
154 LD BC,ADVANC;LOAD ADVANC# TO EHL
155 CALL LDEHL
156 LD A,20 ;COMPUTE 5% OF ADVANCE#
157 CALL DIV24
158 CALL ADEHME ;ADD TO ADVANCE#
159 CALL SVEHL
160 POP HL
161 POP DE
162 POP BC
163 RET
164
165
166 ;LODCOS—LOAD THIS STEP 9 BIT SIGNED COSINE VALUE TO HL.
167 ;ONLY A,HL AFF.
168
```

```
169 LODCOS PUSH DE
170 LD A,(STEPCN+1);LOAD STEP NUMBER
171 LD D,A ;SAVE QUADRANT IN D
172 AND 3FH ;EXTRACT ENTRY#
173 BIT 6,D ;SKIP IF ODD QUADRANT
174 JR NZ,LODCO1
175 LD H,A ;REVERSE TBL ACCESS DIREC
176 LD A,64
177 SUB H
178 LODCO1: 179 LD HL,SINTBL;LOAD+VOLTAGE FROM TABLE
179 CALL LDAHL
180 LD L,A ;PUT+VOL INTO L
181 LD H,0 ;PRELOAD H FOR POSITIVE #
182 LD A,D ;LOAD QUADRANT# TO A(6-7)
183 AND 0C0H
184 JR Z,LODCO2;SKIP IF QUADRANT 0
185 CP 0C0H ;SKIP IF QUADRANT 3
186 JR Z,LODCO2
187 CALL REVSHL ;NEGATE THE VALUE
188 LODCO2 POP DE
189 RET
190
191
192 ;LODSIN—LOAD THIS STEP 9 BIT SIGNED SINE VALUE TO HL
193 ;ONLY A,HL AFF.
194
195 LODSIN: CALL LDSNVL ;LOAD SINE TO (H)L
196 BIT 7,H ;TEST SIGN BIT
197 LOAD H,0 ;PRELOAD FOR POSITIVE
198 CALL NZ,REVSHL;NEGATE THE VALUE IF NEGATIVE
199 RET
200
201 ;WBLADJ—DO WARBLE ADJ OF ADVANCE# FOR GNWSIN
202 ;ONLY A AFF.
203
204 WBLADJ: PUSH BC
205 PUSH DE
206 PUSH HL
207 LD E,0FFH ;LOAD—WARBLE ADJ# TO EHL
208 LD HL,(WADNUM)
209 CALL REVSHL
210 LD BC,ADVANC;ADD TO ADVANCE#
211 CALL ADEHME
212 CALL SEVHL ;SAVE BACK ADV#
213 POP HL
214 POP DE
215 POP BC
216 RET
217
218
219 ; ADVPTR—ADVANCE POINTERS AND COUNTERS FOR DFT.
220 ;ZERO FLAG SET WHEN ARRAY CNTR=0. ONLY A AFF.
221
222 ADVPTR: PUSH DE
223 PUSH HL
224 LD,(STEPCN);ADD ADVANCE# TO STEP COUNTER
225 LD DE,ADVANC+1)
226 ADD HL,DE
227 LD (STEPCN),HL
228 LD HL,(ELECNT);DCR ARRAY ELEMENT COUNTER
229 DEC HL
230 LD (ELECNT),HL
231 LD A,H
232 OR L
233 POP HL
234 POP DE
235 RET
236

237 SUBTITLE 2ND LEVEL SUBROUTINES

238
239 ;D2416V—24 by 16 BIT DIVIDE OF EHL BY BC.
240 ;ONLY DEHL AFF.
241
242 D2416V; LD A,B ;SKIP IF DIVISOR IS <256
243 CP 0
244 JR Z,D24161
245 SRL E ;DIVIDE EHL AND BC BY 2
246 RR H
247 RR L
248 SRL B
249 RR C
250 JR D2416V ;REPEAT TILL BC<256
251 DD2416: LD A,C ;EHL=EHL/ACC
252 CALL DIV24
253 RET
254
255
256 .END
```

What is claimed is:

1. A method for determining the transfer function of a signal processing device in the presence of signal reflections and extrinsic noise, said device having signal input and output, said method including:

i. a computer:
   A. for controlling said method; and
   B. programmed according to a control program incorporating said method;

ii. introducing into said input a pure-tone test signal, from a signal generator, of first frequency fc;

iii. obtaining, by said computer using transform methods, mathematical representations of:
   A. said test signal; and
   B. amplitude and phase information of said test signal from said output;

iii. performing, by said computer, mathematical comparisons of:
   A. said test signal; and
   B. said signal output, and giving said transfer function as output,

SAID METHOD COMPRISING:

a. introducing into said first frequency fc, under control of said computer, a variation therein of −x% fc and +x% fc, said variation being at a second frequency fw which is less than said fc;

b. varying said transform, by said computer, in synchronism with said variation in said first frequency so that said mathematical comparison reflects said transfer function of said device, at said first frequency, including said variation thereof at said second frequency.

2. The method of claim 1 for determining said transfer function, wherein said transform method is a Fourier Transform.

3. The method of claim 1 for determining said transfer function, wherein said transform method is a Discrete Fourier Transform.

4. The method of claim 3, wherein said:

a. mathematical representations are in digital form; and b. said transfer function is displayed in analog form.

5. The method of claim 4, wherein said:

a. mathematical representations are in digital form; and b. said transfer function is displayed in digital form.

6. Apparatus for determining the transfer function of a signal processing device in the presence of signal reflections and extrinsic noise, said device having signal input and output, said apparatus including:

i. a computer:
   A. for controlling said method; and
   B. programmed according to a control program incorporating said method;

ii. introducing into said input a pure-tone test signal, from a signal generator, of first frequency fc;

iii. obtaining, by said computer using transform methods, mathematical representations of:
   A. said test signal; and
   B. amplitude and phase information of said test signal from said output;

iii. performing, by said computer, mathematical comparisons of:
   A. said test signal; and
   B. said signal output, and giving said transfer function as output,

SAID APPARATUS COMPRISING:

a. means for introducing into said first frequency fc, under control of said computer, a variation therein of −x% fc and +x% fc, said variation being at a second frequency fw which is less than said fc;

b. means for varying said transform, by said computer, in synchronism with said variation in said first frequency so that said mathematical comparison reflects said transfer function of said device, at said first frequency, including said variation thereof at said second frequency.

7. The apparatus of claim 6 for determining said transfer function, wherein said transform method is a Fourier Transform.

8. The apparatus of claim 7 for determining said transfer function, wherein said transform method is a Discrete Fourier Transform.

9. The apparatus of claim 8 for determining said transfer function, wherein said:

a. mathematical representations are in digital form; and b. said transfer function is displayed in analog form.

10. The apparatus of claim 9 for determining said transfer function, wherein said:

a. mathematical representations are in digital form; and b. said transfer function is displayed in digital form.

* * * * *

UNITED STATES PATENT AND TRADEMARK OFFICE

CERTIFICATE OF CORRECTION

PATENT NO. :5,703,797
DATED :December 30, 1997
INVENTOR(S) : Russell

It is certified that error appears in the above-identified patent and that said Letters Patent is hereby corrected as shown below:

On the title page, insert the following: -- [63] Continuation of Ser. No. 673,749, filed Mar. 22, 1991.--

Signed and Sealed this

Seventeenth Day of November, 1998

Attest:

BRUCE LEHMAN

*Attesting Officer* *Commissioner of Patents and Trademarks*